US008687350B2

(12) United States Patent
Santos (10) Patent No.: US 8,687,350 B2
(45) Date of Patent: Apr. 1, 2014

(54) MOTHERBOARD AND CASE WITH HIDDEN INTERNAL CONNECTORS

(75) Inventor: Wallace Santos, Union, NJ (US)

(73) Assignee: EZ-Tech Corp, Kenilworth, NJ (US)

( * ) Notice: Subject to any disclaimer, the term of this patent is extended or adjusted under 35 U.S.C. 154(b) by 258 days.

(21) Appl. No.: 13/105,129

(22) Filed: May 11, 2011

(65) Prior Publication Data

US 2012/0287569 A1 Nov. 15, 2012

(51) Int. Cl.
*G06F 1/16* (2006.01)
*H05K 5/00* (2006.01)
*H05K 7/00* (2006.01)

(52) U.S. Cl.
USPC .................................................. 361/679.02

(58) Field of Classification Search
USPC ............ 361/679.32, 679.02, 679.33, 679.37, 361/600, 748, 788, 785, 737
See application file for complete search history.

(56) References Cited

U.S. PATENT DOCUMENTS

| | | | | |
|---|---|---|---|---|
| 4,838,798 A * | 6/1989 | Evans et al. | ...................... | 439/61 |
| 4,846,705 A * | 7/1989 | Brunnenmeyer | ................ | 439/78 |
| 4,883,429 A * | 11/1989 | Suzuki et al. | .................... | 439/74 |
| 5,604,871 A * | 2/1997 | Pecone | .......................... | 710/301 |
| 5,926,378 A * | 7/1999 | DeWitt et al. | .................. | 361/788 |
| 5,963,431 A * | 10/1999 | Stancil | ........................... | 361/803 |
| 6,002,508 A * | 12/1999 | Mai | ............................ | 359/212.1 |
| 6,052,276 A * | 4/2000 | Do et al. | ....................... | 361/679.4 |
| 6,147,863 A * | 11/2000 | Moore et al. | ................ | 361/679.6 |
| 6,216,184 B1 * | 4/2001 | Fackenthall et al. | .......... | 710/301 |
| 6,335,867 B1 * | 1/2002 | Ishibashi et al. | .............. | 361/788 |
| 6,344,975 B1 * | 2/2002 | Gayle | ........................... | 361/788 |
| 6,351,719 B1 * | 2/2002 | Harenza et al. | ................ | 702/118 |
| 6,357,023 B1 * | 3/2002 | Co et al. | ........................... | 714/42 |
| 6,377,471 B1 * | 4/2002 | Chong et al. | ................... | 361/796 |
| 6,388,895 B1 * | 5/2002 | Hsu | ................................. | 361/829 |
| 6,392,142 B1 * | 5/2002 | Uzuka et al. | ................... | 174/541 |
| 6,583,989 B1 * | 6/2003 | Guyer et al. | ................... | 361/724 |
| 6,667,891 B2 * | 12/2003 | Coglitore et al. | ............. | 361/796 |
| 6,757,177 B2 * | 6/2004 | Harris et al. | ................... | 361/788 |
| 6,791,828 B2 * | 9/2004 | Gough et al. | ............. | 361/679.33 |

(Continued)

OTHER PUBLICATIONS

"SkulloNinja Dual Mod", mrcaesar.wordpress.com, published: Jul. 19, 2010.

*Primary Examiner* — Hoa C Nguyen
*Assistant Examiner* — Xanthia C Cunningham
(74) *Attorney, Agent, or Firm* — Michael J. Feigin, Esq.; Feigin & Associates, LLC (57) ABSTRACT

The disclosed technology describes a motherboard with an arrangement of components that is aesthetically pleasing and enables ease of servicing. Inner components, such as add-on cards, memory slots and the CPU on the motherboard, are easily accessible through a removable side of the computer case. The cable connectors on the motherboard for internal components are hidden from view when the removable side of the computer case is opened or cannot be seen if the removable side of the computer case is translucent. As such, at least a portion of cables which connect between the motherboard and other devices, such as disk drives, the power supply and LED (Light Emitting Diodes) is at least partially, mostly or fully hidden from view when the removable portion of the case is removed. Further when servicing the computer, the cables are out of the way of the various microchips and add-on cards which connect to the motherboard. Thus, the appearance of the computer case and motherboard of the disclosed technology is visually attractive and the unit is overall easier to service than those available in the prior art.

20 Claims, 7 Drawing Sheets

(56) References Cited

U.S. PATENT DOCUMENTS

| | | | |
|---|---|---|---|
| 6,820,156 B1* | 11/2004 | Miller et al. | 710/301 |
| 6,843,657 B2* | 1/2005 | Driscoll et al. | 439/65 |
| 7,019,984 B2* | 3/2006 | Driscoll et al. | 361/788 |
| 7,154,761 B1* | 12/2006 | Camerlo et al. | 361/788 |
| 7,256,594 B2* | 8/2007 | Kim et al. | 324/756.02 |
| 7,272,017 B2* | 9/2007 | Kwatra et al. | 361/807 |
| 7,643,286 B2* | 1/2010 | Hirai et al. | 361/679.5 |
| 7,676,624 B2* | 3/2010 | Chu | 710/313 |
| 7,692,930 B2 | 4/2010 | Petersen et al. | |
| 7,737,360 B2* | 6/2010 | Wiemeyer et al. | 174/50 |
| 7,782,630 B2* | 8/2010 | Kajio et al. | 361/788 |
| 8,045,324 B2* | 10/2011 | Shen et al. | 361/679.02 |
| 8,358,511 B2* | 1/2013 | Huels et al. | 361/788 |
| 2003/0012004 A1* | 1/2003 | Uehara | 361/748 |
| 2003/0016490 A1* | 1/2003 | Miller et al. | 361/683 |
| 2003/0123220 A1* | 7/2003 | Huang | 361/685 |
| 2004/0057202 A1* | 3/2004 | Rabinovitz | 361/685 |
| 2004/0057203 A1* | 3/2004 | Rabinovitz | 361/685 |
| 2004/0066638 A1* | 4/2004 | Streltsov | 361/788 |
| 2005/0117282 A1* | 6/2005 | Shtargot et al. | 361/679 |
| 2005/0237724 A1* | 10/2005 | Fiorentino et al. | 361/752 |
| 2005/0277327 A1* | 12/2005 | Aziz et al. | 439/528 |
| 2006/0002061 A1* | 1/2006 | Hua | 361/680 |
| 2006/0067066 A1* | 3/2006 | Meier et al. | 361/785 |
| 2008/0024999 A1* | 1/2008 | Huang | 361/724 |
| 2008/0174458 A1* | 7/2008 | Mundt et al. | 341/34 |
| 2008/0186666 A1* | 8/2008 | Wu | 361/685 |
| 2009/0016017 A1* | 1/2009 | Yu et al. | 361/687 |
| 2009/0027867 A1* | 1/2009 | Yamamoto et al. | 361/785 |
| 2009/0174991 A1* | 7/2009 | Mahdavi | 361/679.02 |
| 2009/0251867 A1* | 10/2009 | Sharma et al. | 361/737 |
| 2010/0020478 A1* | 1/2010 | Chu | 361/679.02 |
| 2010/0226087 A1* | 9/2010 | Tai et al. | 361/679.33 |

* cited by examiner

MOTHERBOARD AND CASE WITH HIDDEN INTERNAL CONNECTORS

FIELD OF THE DISCLOSED TECHNOLOGY

The disclosed technology relates generally to motherboards and computer cases, and more specifically to the placement of components on a motherboard.

BACKGROUND OF THE DISCLOSED TECHNOLOGY

Most desktop computers have a case, a monitor, a keyboard and a mouse. The case encloses the computer's hardware and provides outlets for connecting to the power source and peripherals. The backbone of the modern personal computer is the motherboard that interfaces directly with many of the key elements of the computer's hardware, such as the CPU, sound and video cards, microchips, and volatile/non-volatile memory. The motherboard also connects via cables to internal devices, such as to internal drives, power sources, and other peripherals.

Earlier computer cases were monochrome, steel units that could be opened to access the motherboard for repair/upgrade purposes. In contrast, more modern desktop and laptop computers are trending towards sleek designs with, for example, plastic cases available in multiple colors and with accouterments such as lights, designs, and matching decor. They may offer an infrared mouse and keyboard to decrease the clutter caused by electrical wires, and LED (light emitting diode) flat screen monitors that occupy minimal desk space. The modern motherboard has also undergone some changes to increase functionality and stability while providing a smaller size. However, the overall appearance of the inside of a personal computer is quite cluttered. Further, the electrical sockets for interchangeable components (memory, add-on cards) are not easily accessible because they are buried below the cables that connect multiple devices (drives, power sources) to the motherboard.

The simple task of adding or replacing an add-on card becomes cumbersome, due to entangling cables that are suspended above, and/or attached to, the motherboard. Care is needed to ensure that the cable connectors are not loosened, stretched, or broken during the upgrading process, thereby affecting the connectivity of various components. This makes it difficult for individual users, as well as skilled technicians, to work inside a computer, as is needed to replace cards on the motherboard or change the configuration of a computer. Thus, most people must turn to computer service centers or computer technicians for help in replacing defective cards or increasing memory, incurring considerable cost due to the skill and time it takes for a technician to carry out the desired task. Clearly, anyone attempting to see for himself the inner workings of his/her computer is likely to encounter an impenetrable jumble inside his desktop or laptop.

Thus, there is an unsolved need to make personal desktop and laptop computers easier to service as well as aesthetically more pleasing.

SUMMARY OF THE DISCLOSED TECHNOLOGY

The disclosed technology describes an arrangement of components on a motherboard, and the placement of the motherboard inside a computer case. The motherboard of the disclosed technology may utilize a printed circuit board.

An object of the disclosed technology is to simplify working inside a computer. This is accomplished, in an embodiment of the disclosed technology, by arranging electrical sockets for the central processing unit (CPU) and slots of add-on cards on one side of the motherboard (hereinafter referred to as "the front side") and placing all of the internal cable connectors on the back side of the motherboard.

Another object of the disclosed technology is to enhance the aesthetics of a computer by constructing a computer case with a removable side that opens to a clear view of the front side of a motherboard. This is accomplished, in an embodiment of the disclosed technology, by placing cables attached to internal connectors on the back side of the motherboard, hidden from view.

In an embodiment of the disclosed technology, the motherboard comprises a front side with electrical sockets, where at least one electrical socket is adapted for functional engagement with a CPU and at least one electrical socket is adapted for functional engagement with an add-on card. All the electrical sockets, in an embodiment thereof, are present only on the front side of the motherboard. Additional electrical sockets on the front side, in an embodiment, are designed for electrical engagement with at least one random access memory card or the equivalent thereof, and/or at least one add-on card.

The back side of the motherboard, in such embodiments, further comprises a plurality of internal cable connectors, each adapted for removable engagement with a corresponding cable. The back side is opposite the front side. All of the internal cable connectors adapted for cables are attached to the back side of the motherboard, in an embodiment thereof. The motherboard is fixedly attached to an attachment side of the computer case, and at least one cable connected to the internal cable connector extends between the attachment side of the computer case and the back side of the motherboard. A majority of the corresponding cables may be situated between the attachment side of the computer case and the back side of the motherboard. At least one of the corresponding cables may attach to a disk drive, and at least one of the corresponding cables may attach to a power source (such as an internal power supply).

The motherboard may further comprise external cable connectors that abut an edge between the front and the back side of the motherboard and are attached to the front side of the motherboard. Thus, components attached to the motherboard may include a socket for a CPU, slots for add-on cards, and internal and external connectors connecting to respective internal and external devices to the case. The motherboard is fixedly attached to one side of a computer case, which is the attachment side of the computer case in embodiments of the disclosed technology.

In another embodiment of the disclosed technology, a computer case comprises an attachment side which is fixedly attached to an attachment side of a motherboard and further comprises a removable side on the computer case. The removable side of the computer case may open perpendicularly or may open opposite to the attachment side of the computer case in such embodiments. In such embodiments, the electrical socket for CPU and slots for add-on cards on the motherboard are viewable when the removable side is opened. Internal connectors, in such embodiments, are present on the attachment side of the motherboard, and at least a portion of cables connected to the internal connectors is hidden from view when the removable side of the computer case is removed. Thus, most of each cable connected to the internal connector is obstructed from view by the motherboard when viewing the motherboard from or through the removable side of the computer case, in such embodiments. In another embodiment of the disclosed technology, at least one external connector abutting the edge of the motherboard attached to a computer case is available for removable engagement to an external device.

In another embodiment of the disclosed technology, the motherboard comprises a front side and a back side, with the front side further comprising electrical sockets for a CPU and at least one add-on card. The back side, in such embodiments, comprises a plurality of internal cable connectors each adapted for removable engagement with a corresponding cable. All of the electrical sockets are present on the front side of the motherboard and are available for attachment to at least one random access memory card and at least one add-on card, in such embodiments. All of the internal cable connectors adapted for removable engagement with the corresponding cables are present on the back side of the motherboard, in such embodiments. The internal cable connectors are available for attachment to at least one disk drive and at least one power source, in such embodiments.

In another embodiment of the disclosed technology, the motherboard is fixedly attached to an attachment side of a computer case. The computer case further comprises a removable side which opens to the front side of the motherboard, in such an embodiment. Internal connectors available for attachment to corresponding cables are present on the back side of the motherboard, in such embodiments. The internal connectors and their corresponding cables are obstructed from view by the motherboard when the removable side of the computer case is opened, in such embodiments. The majority of corresponding cables is situated between the attachment side of the computer case and the back side of the motherboard, in such embodiments. The internal connector may connect to a disk drive and a power source through corresponding cables, in such embodiments. At least one external cable connector abuts the edge of the motherboard, in such an embodiment. The external cable connector is available for electrical engagement with an external device when the motherboard is fixedly attached to the computer case, in such an embodiment.

DETAILED DESCRIPTION OF EMBODIMENTS OF THE DISCLOSED TECHNOLOGY

The disclosed technology describes a motherboard with an arrangement of components that is aesthetically pleasing and enables ease of servicing. Inner components, such as add-on cards, memory slots and the CPU on the motherboard, are easily accessible through a removable side of the computer case. The cable connectors on the motherboard for internal components are hidden from view when the removable side of the computer case is opened or cannot be seen if the removable side of the computer case is translucent. As such, at least a portion of cables which connect between the motherboard and other devices, such as disk drives, the power supply and LED (light emitting diodes) switches are at least partially, mostly or fully hidden from view when the removable portion of the case is removed. Further, when servicing the computer, the cables are out of the way of the various microchips and add-on cards which connect to the motherboard. Thus, the appearance of the computer case and motherboard of the disclosed technology is visually attractive and the unit overall is easier to service than those available in the prior art.

Embodiments of the disclosed technology are described below, with reference to the figures provided.

Figure 1:
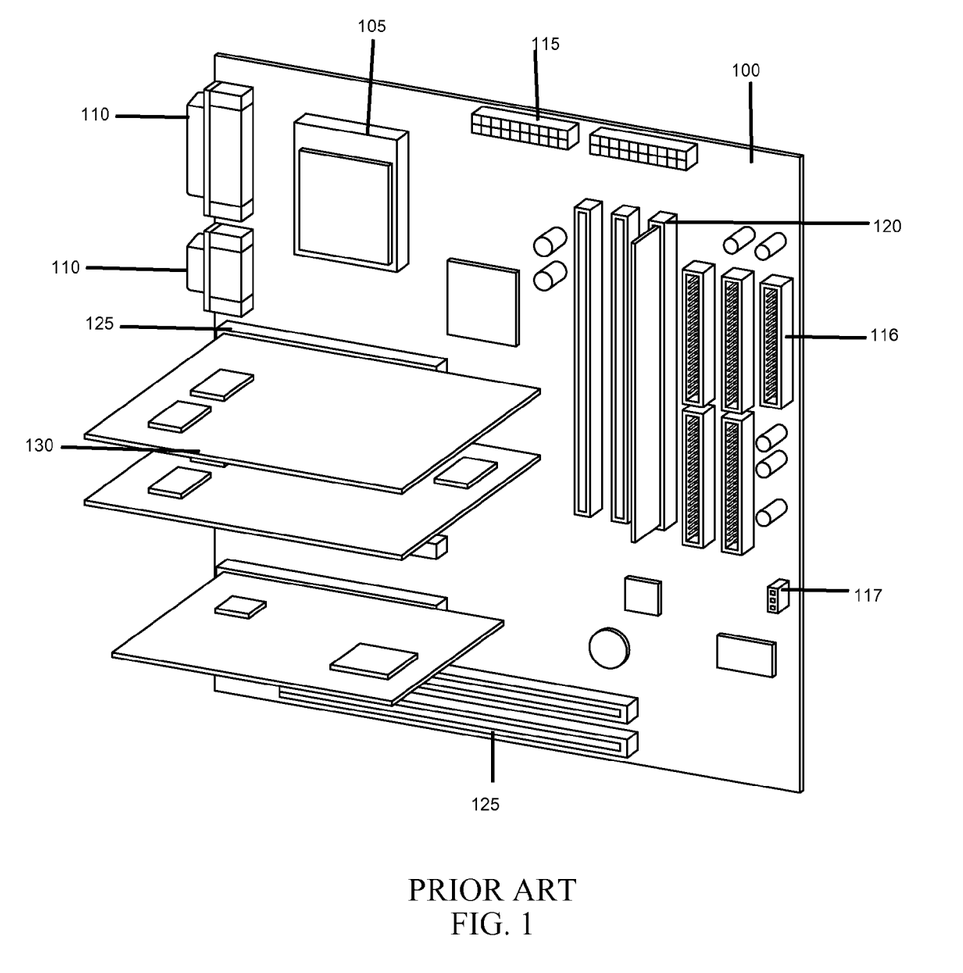
FIG. 1 shows a front perspective view of a motherboard of the prior art.
Figure 2:
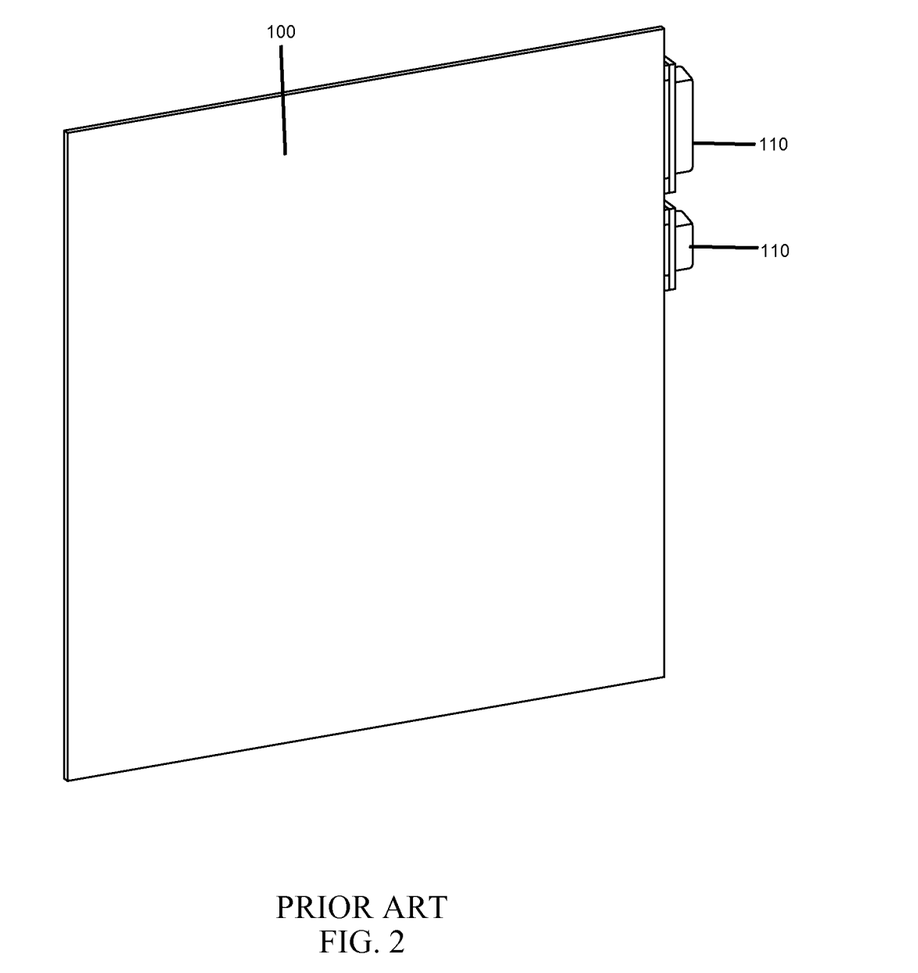
FIG. 2 shows a rear perspective view of the motherboard of FIG. 1.
Figure 3:
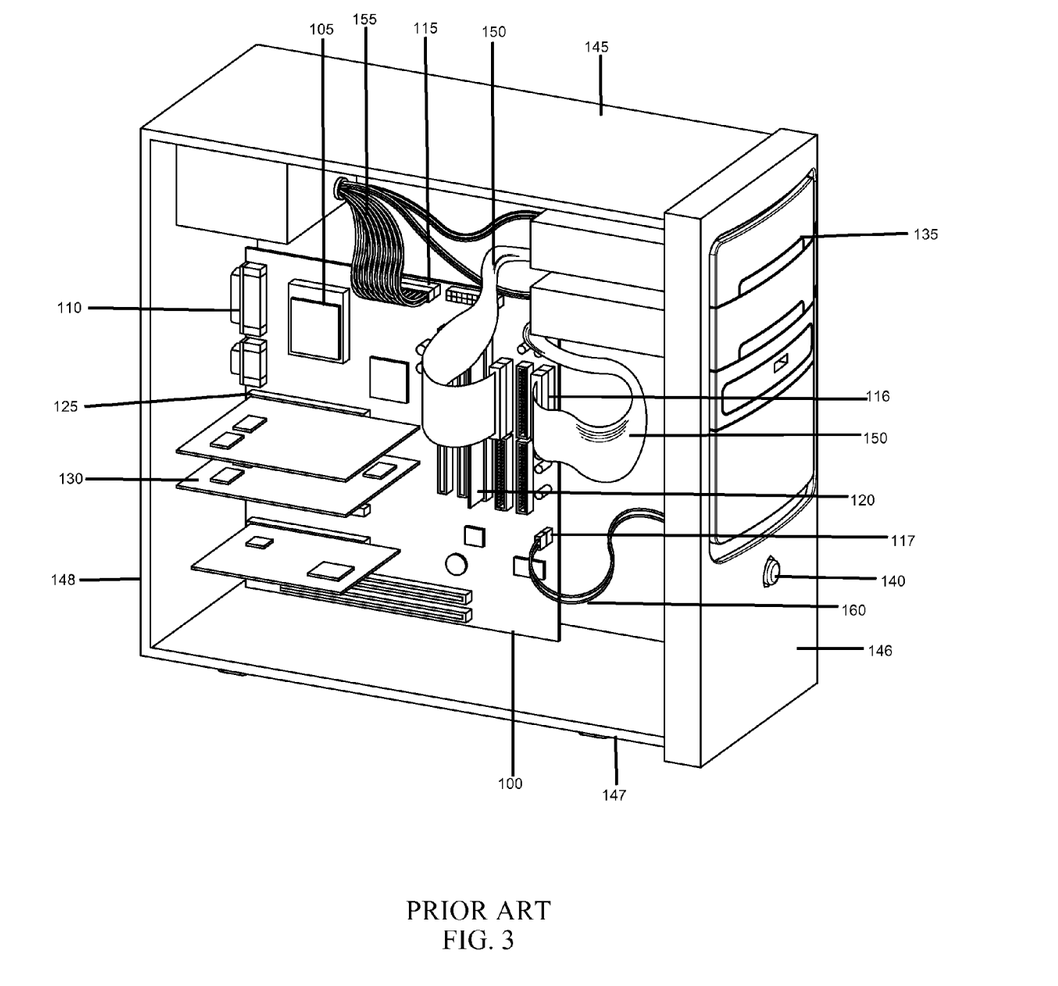
FIG. 3 shows the motherboard of FIG. 1 inside a computer case.

FIGS. 1 to 3 describe a typical motherboard from prior art, as well as its various components. FIGS. 4 to 7 describe the arrangement of components on a motherboard and the latter's attachment to a computer case in an embodiment of the disclosed technology.

Referring now to the figures, FIG. 1 shows a front perspective view of a motherboard of the prior art. The motherboard of a computer is the main printed circuit board that interfaces with crucial components of the computer which are mounted thereon, including the CPU and volatile memory. It is generally a flat circuit board comprising the bus system of the computer and has connectors to connect, at least, to internal devices and peripherals. It controls the flow of data for many of the components of a computer. It is also called the logic board (in Apple computers) or the main board, or system board. The two sides of the motherboard have been defined as the front side and back side in embodiments of disclosed technology, depending on the components that are present on it and its manner of attachment to a computer case.

Typical individual components present on a prior art motherboard 100 are shown in FIG. 1. The motherboard of prior art typically has an electrical socket for a microprocessor, such as a CPU (Central Processing Unit) 105 that carries out most of the data processing inside a computer. There is one or multiple memory slots 120 on the motherboard, such as in the form of DIMM (Dual In-line Memory Module) with DRAM (Dynamic Random Access Memory) chips. The motherboard has add-on card slots 125 for devices such as video cards, sound cards, internal modems or network cards 130. The add-on card slots are usually of the type PCI (peripheral component interconnect) or sometimes maybe AGP (accelerated graphics port) for fast video cards. External connectors 110 are used for attachment to peripheral devices and may abut the edge of the motherboard, in embodiments of the technology. They are used to connect devices via USB (Universal Serial Bus) ports, serial ports, parallel ports (for printers), network ports, sound in/out, power source etc.

FIG. 1 further shows internal connectors on a motherboard that are available for removable engagement with corresponding cables. Internal connectors are adapted for electrical engagement via corresponding cables to internal elements in a computer. The internal connectors may connect to power supply sources 115, internal drives 116 (such as hard drives, disk drives and CD/DVD drives), or a LED switch 117, amongst other components found within a computer. In the prior art, internal cable connectors are present on the same side of the motherboard as the electrical sockets for the CPU and add-on card slots. Thus, the motherboard appears cluttered due to having a majority of components crowded onto this side.

FIG. 2 shows a rear perspective view of the prior art motherboard 100 of FIG. 1. This view shows external connectors 110 that abut the edge of the motherboard. The external connectors can be of different types; for example, some connect peripherals (such as keyboard, mouse), others connect network or LAN devices, and most motherboards also have multiple USB ports to connect with external devices. The back side of the prior art motherboard has fewer components than the front side, and this feature has been modified in the embodiment of the disclosed technology by moving the internal connectors to the back side of the motherboard.

FIG. 3 shows a motherboard of FIG. 1 inside a computer case. One panel of the computer case has been removed in the diagram for viewing the motherboard. This figure shows all of the components described before (for FIG. 1) on the motherboard, namely CPU 105, external connectors 110, memory slots 120, slots for add-on cards 125 and add-on cards 130. This figure further shows a simplified view of the multiple cables that connect to the motherboard. The cables are typically attached to internal connectors on the motherboard. Thus the internal connector 115, attached to corresponding cable 155, is connected to a power supply source. The internal connector 116, attached to corresponding cable 150, is connected to an internal disk drive 135. Another variant of internal connector 116 may connect to a hard drive. The internal connector 117, attached to a corresponding cable 160, is connected to a LED switch 140. The sides of a prior art computer case are as follows: the top side is 145, the front side is 146, bottom side is 147 and the back side is 148. This figure illustrates that most of the corresponding cables are present on this side of the computer case. They are suspended over the slots for memory cards and other add-on cards on the motherboard. This makes it difficult to reach under the cables to replace add-on cards on the motherboard or to repair elements on the motherboard. Furthermore, when the computer is opened for viewing, the overall appearance of the motherboard is cluttered.

Elements in FIGS. 4 through 7 are incremented by one hundred over corresponding elements in FIGS. 1 through 3. For example, motherboard 100 in FIGS. 1 through 3 is called motherboard 200 in FIGS. 4 through 7.

Figure 4:
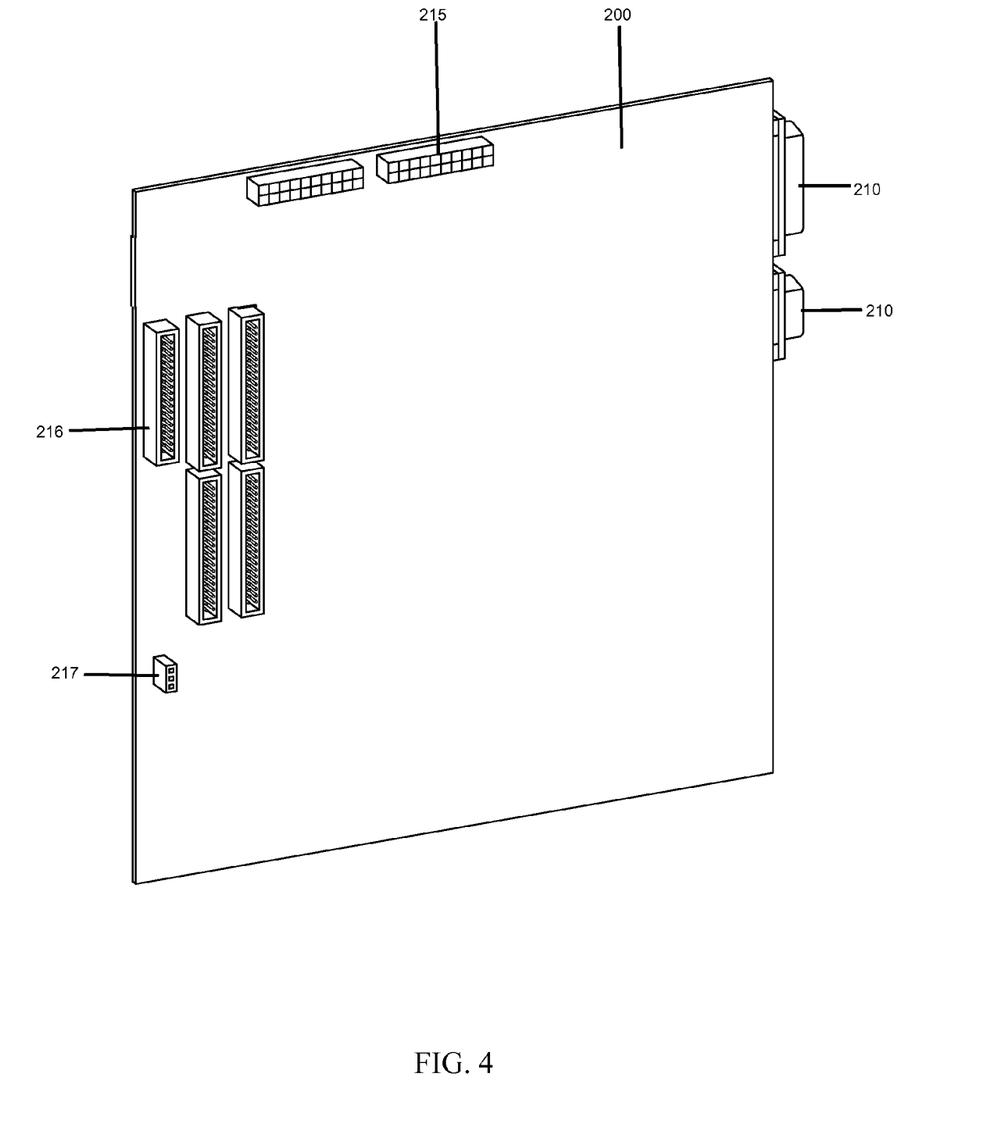
FIG. 4 shows a rear perspective view of a motherboard in an embodiment of the disclosed technology.

FIG. 4 shows a rear perspective view of a motherboard in an embodiment of the disclosed technology. The view shows the back side of the motherboard 200 with internal connectors 215, 216 and 217. This back side is the side of the motherboard that faces the attachment side of the computer case, the attachment side being the side of the computer case to which the motherboard is fixedly attached. The attachment side of the computer case is placed either opposite or perpendicular to the removable side of the computer case in embodiments of the disclosed technology. In the embodiments of the disclosed technology, all internal connectors are placed on the back side of the motherboard. The internal connectors are of different types, in order to connect to different internal elements in a computer. An internal connector is an electrical connector on the motherboard adapted for electrical engagement with a cable, in order to interface with another device which is inside the computer case. For example, internal connector 215 connects the motherboard to a power supply source; multiple internal connectors 216 connect the motherboard to multiple drives such as hard drives, internal disk drives, and multimedia drives such as CD or DVD drive and internal connector 217 connects the motherboard to an LED switch used to turn on the computer. External connectors 210 that abut an edge on the motherboard are shown, and these can be used to connect the motherboard to one or multiple external devices. The external connectors come in a variety of sizes and shapes, for example, round PS/2 ports (Personal System 2), that connect to keyboard and mouse, parallel ports or serial ports used for printers or other removable media devices, the LAN (Local Area Network) or networking port and USB ports. In most modern motherboards multiple USB ports have replaced the functionality of the other above-mentioned ports. The USB ports can connect to printers, input devices such as keyboard and mouse, storage devices, networking devices, and many other devices. The internal connectors of the motherboard of the embodiment of the disclosed technology may be functionally engaged to corresponding cables. All of the corresponding cables attach to the back side of the motherboard in the disclosed technology. These corresponding cables and their connections are shown in the next figure of the motherboard inside a computer case.

Figure 5:
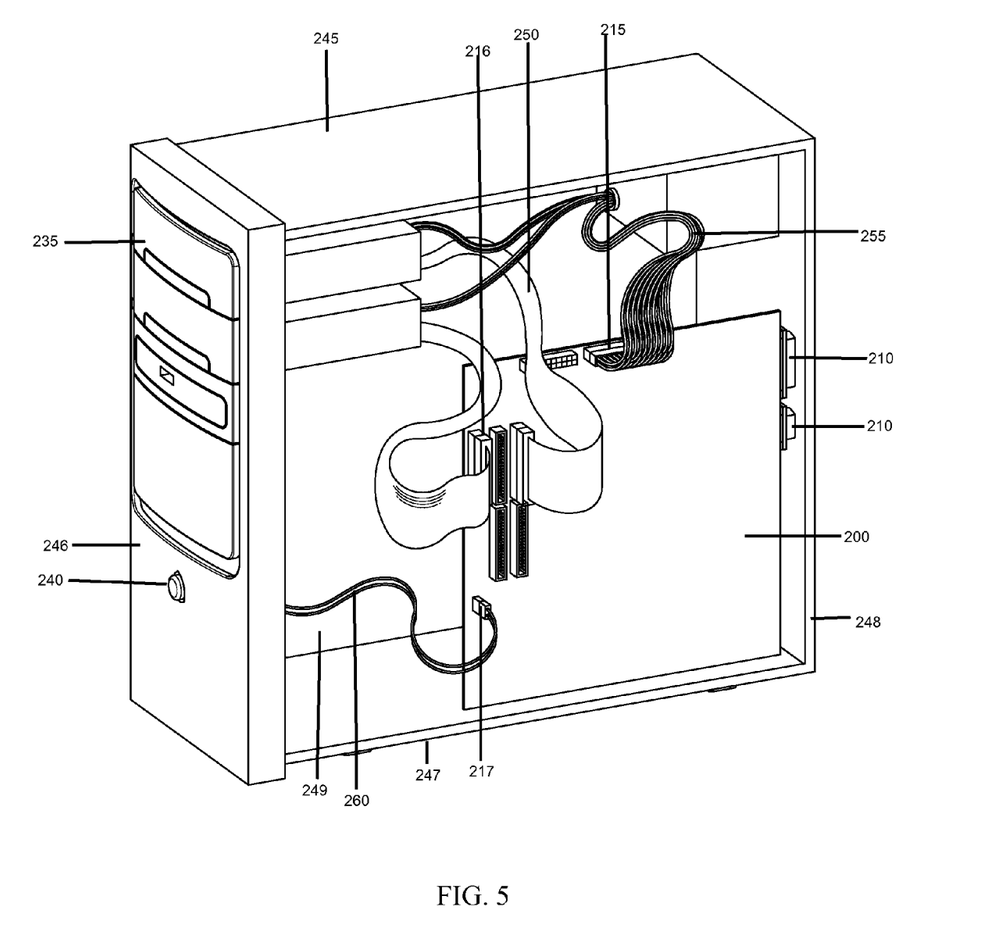
FIG. 5 shows a rear perspective view of the motherboard of FIG. 4 inside a computer case, in an embodiment of the disclosed technology.
Figure 6:
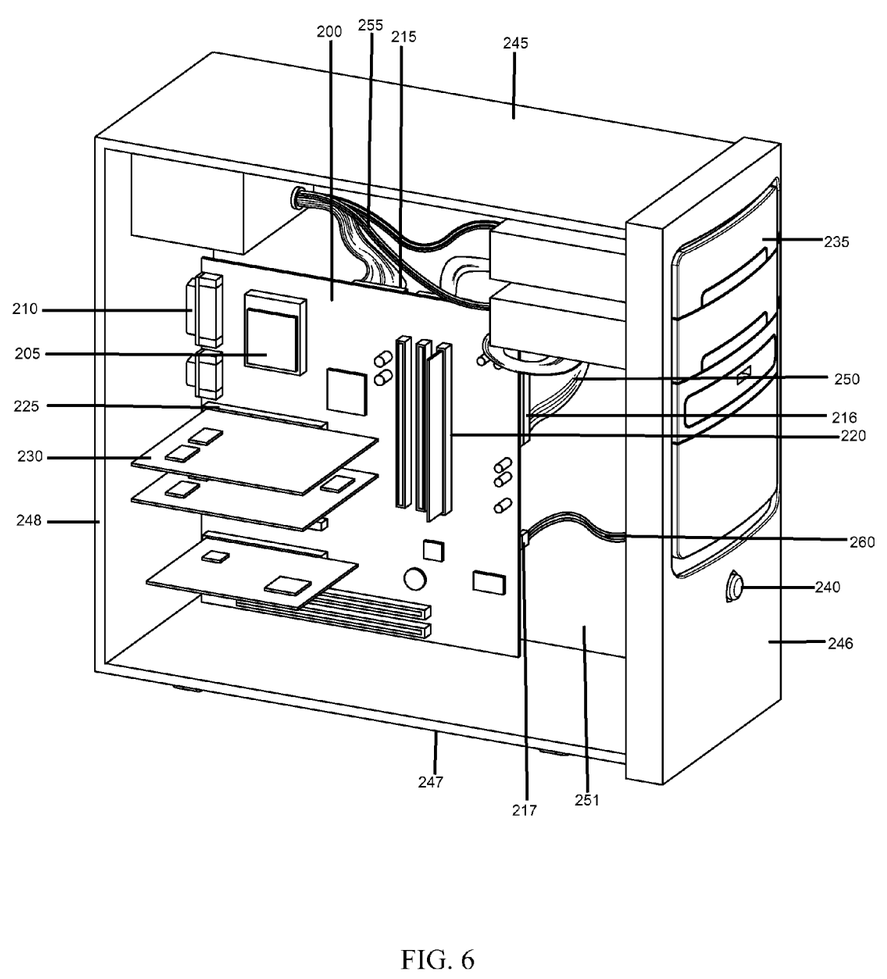
FIG. 6 shows a front perspective view of the motherboard of FIG. 4 inside a computer case, in an embodiment of the disclosed technology.

The motherboard is fixedly attached to a computer case in embodiments of the disclosed technology. The sides of the computer case shown in FIGS. 5 and 6 are as follows: the top side of the case is 245; the front side of the case is 246 and has the LED switch 240 and disk drive bays 235; the bottom side of the computer case is 247 and the back side of the computer case 248. This computer case also has two side panels to make a total of six sides, of which one is called the removable side 249 and the other is called the attachment side 251. The attachment side 251 of the computer case faces the back side of the motherboard. All of the cables that connect to internal connectors are held between the back side of the motherboard and the attachment side of the computer case. The removable side 249 of the computer case faces the front side of the motherboard. When the removable side of the computer case is opened, the view inside shows the motherboard with electrical sockets for CPU and add-on card slots, but the internal connectors and the corresponding cables that connect to them are hidden from view below the motherboard. The removable side may be placed perpendicular to the attachment side or opposite the attachment side of the computer case. Another embodiment of the disclosed technology may have a different configuration of the computer case, with the removable side being positioned perpendicular to the attachment side and can still open to a front view of the motherboard (not shown in the current figures). The figures below show an arrangement of the computer case with the removable side placed opposite the attachments side.

FIG. 5 shows a rear perspective view of the motherboard inside a computer case in an embodiment of the disclosed technology. In this view, the back side of the motherboard is shown with internal connectors and their corresponding cables. Connections that lead from the internal connectors to various internal elements in a computer are also detailed in this figure. Thus, internal connector 216 connects via corresponding cable 250 to an internal disk drive 235, internal connector 215 connects via corresponding cable 255 to a power supply source, and internal connector 217 connects via corresponding cable 260 to LED switch 240. The sides of the computer case shown in FIG. 5 are as follows: the top side of the case is 245, the front side 246 has disk drive bay 235 and LED switch 240, the bottom side of the case 247 and the back side of the computer case 248. The computer case also has two side panels to make a total of six sides. One side panel is called the removable side 249, and this is visible in FIG. 5 below the motherboard. The opposite side panel 251 is called the attachment side and is not visible in FIG. 5 but shown in FIG. 6. This is the non-removable side panel that encloses all of the corresponding cables between the back side of the motherboard and itself. These cables are hidden from view below the motherboard when the computer case is opened at the removable side 249. The detailed organization of the front side of the motherboard is shown in the next two figures (FIG. 6 and FIG. 7).

FIG. 6 shows a front perspective view of the motherboard inside a computer case in an embodiment of the disclosed technology. One side of the computer case is not shown in FIG. 6 (called removable side 249), in order to show the internal organization of the motherboard. The front side of the motherboard 200 inside a computer case has the following elements: an electrical socket 205 for a microprocessor or the CPU, multiple memory slots 220, additional slots 225 for video display, sound and graphics add-on cards 230. The CPU or a microprocessor 205 carries out the task of interpreting and executing instructions in a computer and is usually present as a single microchip on an electrical socket on the motherboard. The memory, also called RAM or Random Access Memory, is held in chips 220 and accessed by the microprocessor randomly for performing multiple functions. Most modern motherboards have multiple slots for DIMM (Dual In-line Memory Module) that comprise a series of dynamic random access memory circuits (DRAM) chips. The front side of the motherboard, in an embodiment of the disclosed technology, has additional PCI (Peripheral Component Interconnect) card slots 225, used for attaching multiple hardware devices onto the motherboard. Typical PCI or add-on cards 230 include sound, network, modem, USB ports and TV tuners, etc. Modern motherboards also offer expansion card slots 225, with a variety of additional video or graphics capabilities such as faster rendering of 2D (two-dimensional) or 3D scenes, video capture or connection to multiple monitors. The front side of the motherboard does not contain internal connectors in embodiments of the disclosed technology. Thus the internal connectors, 215, 216, and 217, placed on the back side of the motherboard, are hidden from view in this figure. The corresponding cables, 250, 255, and 260, that connect from the internal connectors to various internal elements on the computer, are only partially visible in this view of the motherboard. They are hidden below the motherboard when this side of the computer case is removed.

The sides of the computer case have been labeled in FIG. 6 and are as follows: top side 245, front side 246, bottom side 247, back side 248 and the attachment side 251. This attachment side is shown below the motherboard and faces the back side of the motherboard. Most of the corresponding cables and their connections are positioned between the attachment side and the back side of the motherboard. This attachment side is fixed, and thus the cables are held safe and not disturbed if the removable side 249 of the computer case is opened for addition/upgrade or repair. FIG. 6 highlights the key features of the disclosed technology, namely the ease of replacing cards and servicing the motherboard without the clutter of overhanging cables on this side of the motherboard. The motherboard fixedly attached to a computer case in an example of the embodiment of the disclosed technology is described in two different views: the back side of the motherboard with internal connectors and their corresponding cables, which are visible in FIG. 5 when the attachment side is removed; and the front side of the motherboard with electrical sockets and add-on card slots, which are visible in FIG. 6 when the removable side is removed.

Figure 7:
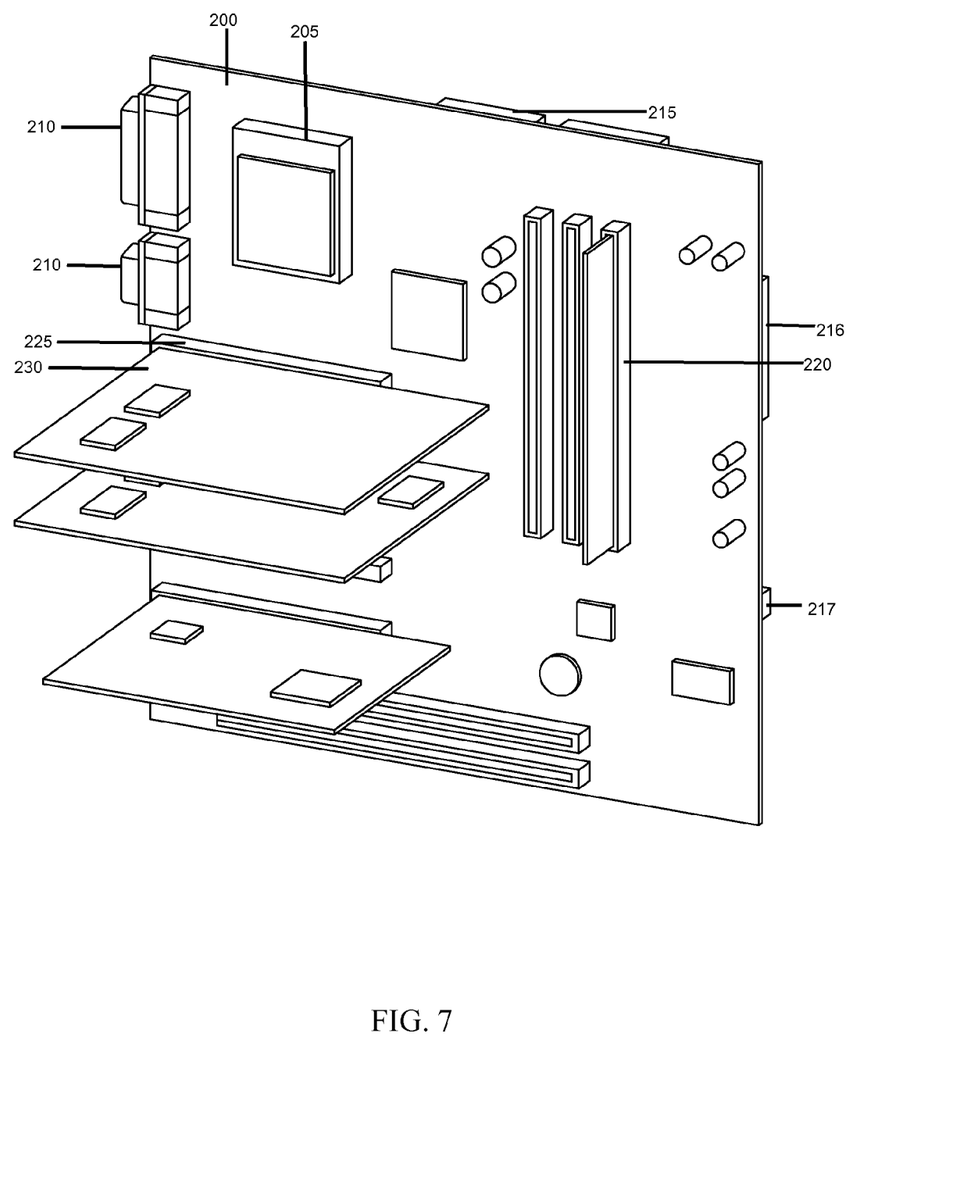
FIG. 7 shows a front perspective view of the motherboard in an embodiment of the disclosed technology.

FIG. 7 shows a front perspective view of the motherboard in an embodiment of the disclosed technology. This view of the motherboard shows the arrangement of electrical sockets for CPU and add-on cards on the front side of the motherboard in the embodiment of the disclosed technology. The internal connectors are partially hidden, since they are present on the back side of the motherboard. The various parts are labeled as follows: Motherboard is 200, the microprocessor or CPU is 205, external connector is 210, internal connector for a power cable is 215, internal connector for an internal drive is 216 and internal connector for the LED switch is 217, memory slots are 220, other add-on card slots are 225 and add-on cards are 230. As has been mentioned before, the motherboard, in an embodiment of the disclosed technology, has multiple types of slots with a variety of functions. These have been described above in the description of FIG. 6. The motherboard of the disclosed technology also has multiple types of external and internal connectors, which have been described above for FIGS. 4 and 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A motherboard and a computer case comprising:
an attachment side of a computer case;
a removable side of said computer case;
a back side of a motherboard facing said attachment side of said computer case, said back side of said motherboard comprising a plurality of internal cable connectors, each adapted for removable engagement with a corresponding internal cable;
a front side of said motherboard, opposite from said back side, said front side comprising electrical sockets, wherein at least one electrical socket is adapted for functional engagement with a CPU and at least one electrical socket is adapted for functional engagement with an add-on card, said front side facing a removable side of said computer case; and
wherein all said internal cable connectors adapted for said internal cables are attached to said back side.

2. The motherboard and computer case of claim 1, wherein all electrical sockets are attached to said front side.

3. The motherboard and computer case of claim 2, further comprising a plurality of external cable connectors, wherein all said external cable connectors abut an edge between said front and said back side of said motherboard and are attached to said front side of said motherboard.

4. The motherboard and computer case of claim 1, wherein said motherboard is fixedly attached to and spaced from said attachment side of said computer case and all said internal cables connected to said internal cable connectors extend from a space between said attachment side of said computer case and said back side of said motherboard.

5. The motherboard and computer case of claim 4, wherein a majority of each of said internal cables is situated between said attachment side of said computer case and said back side of said motherboard.

6. The motherboard and computer case of claim 5, wherein at least one said internal cable attaches to a disk drive and at least one said internal cable attaches to a power source.

7. The motherboard and computer case of claim 1, wherein said electrical sockets on said front side are electrically engaged with at least one random access memory card and at least one add-on card.

8. A computer case comprising:
- an attachment side of said case fixedly attached to an attachment side of a motherboard;
- a removable side of said case opposite said attachment side of said case, and facing a front side of said motherboard comprising a CPU;
- internal connectors attached to said attachment side of said motherboard;
- a plurality of internal cables, connected to said internal connectors, each extending from between said attachment side of said case and said attachment side of said motherboard;
- wherein said internal connectors and at least a portion of cables connected to said internal connectors are hidden from view when said removable side of said case is removed, and said front side of said motherboard is visible when said removable side of said case is removed.

9. The computer case of claim 8, wherein said removable side of said case further opens perpendicular to said attachment side of said computer case.

10. The computer case of claim 8, wherein said removable side of said case opens toward said front side of said motherboard.

11. The computer case of claim 8, wherein most of each cable connected to a said internal connector is obstructed from view by said motherboard when viewing said motherboard from or through said removable side.

12. The computer case of claim 10, wherein said front side of said motherboard further comprises at least one external connector abutting the edge of said motherboard for removable engagement to an external device.

13. A motherboard comprising:
- a front side further comprising electrical sockets for a CPU and at least one add-on card; and
- a back side opposite said front side, comprising a plurality of internal cable connectors each adapted for removable engagement with a corresponding cable,
- wherein said motherboard is housed in a computer case such that said front side faces a removable side of said computer case and said back side faces an attachment side of said computer case, and
- wherein each said corresponding cable extends from between said back side of said motherboard and said attachment side of said computer case.

14. The motherboard of claim 13, wherein all said electrical sockets are on said front side of said motherboard and are attached to at least one random access memory card and at least one add-on card.

15. The motherboard of claim 13, wherein all said internal cable connectors adapted for removable engagement with said corresponding cables attach to said back side of said motherboard.

16. The motherboard of claim 13, wherein said motherboard is fixedly attached to, and spaced from, said attachment side of a computer case, and said removable side of said computer case opens to said front side of said motherboard such that said internal connectors are obstructed from view by said motherboard.

17. The motherboard of claim 16, wherein a majority of each of said corresponding cables is situated between said attachment side of said computer case and said back side of said motherboard.

18. The motherboard of claim 16, wherein at least one said corresponding cable attaches to a disk drive and at least one said corresponding cable attaches to a power source.

19. A motherboard of claim 13, wherein at least one external cable connector abuts the edge joining said front side and said back side of said motherboard.

20. A motherboard of claim 19, fixedly attached to said attachment side of said computer case, wherein said external cable connector is available for electrical engagement with an external device.

* * * * *